US006715977B2

(12) United States Patent
(10) Patent No.: US 6,715,977 B2
(45) Date of Patent: Apr. 6, 2004

Dobner et al.

(54) LOADING DEVICE FOR ISO CONTAINERS

(75) Inventors: Mathias Dobner, Rommerskirchen (DE); Hermann Franzen, Mönchengladbach (DE); Joachim Kröll, Jüchen (DE)

(73) Assignee: Gottwald Port Technology GmbH, Düsseldorf (DE)

(*) Notice: Subject to any disclaimer, the term of this patent is extended or adjusted under 35 U.S.C. 154(b) by 2 days.

(21) Appl. No.: 10/244,769

(22) Filed: Sep. 16, 2002

(65) Prior Publication Data

US 2003/0077149 A1 Apr. 24, 2003

(30) Foreign Application Priority Data

Sep. 14, 2001 (DE) ........................................ 101 45 513

(51) Int. Cl.[7] .......................... B63B 27/12; B65G 67/60

(52) U.S. Cl. ................................ 414/141.3; 414/139.9; 414/140.3; 414/803

(58) Field of Search ........................... 414/139.4, 139.9, 414/140.1, 140.3, 141.3, 803; 212/270, 325

(56) References Cited

U.S. PATENT DOCUMENTS

| | | | | | |
|---|---|---|---|---|---|
| 984,700 | A | * | 2/1911 | Pope | 202/229 |
| 1,421,787 | A | * | 7/1922 | Kininmonth | 198/509 |
| 3,807,582 | A | * | 4/1974 | Anderson | 414/141.3 |
| 4,106,639 | A | * | 8/1978 | Montgomery et al. | 414/141.3 |
| 4,293,077 | A | | 10/1981 | Makilno | 212/219 |
| 5,039,275 | A | * | 8/1991 | Ide | 414/803 |
| 5,160,012 | A | * | 11/1992 | Jonke | 198/369.2 |
| 5,515,982 | A | * | 5/1996 | Hasegawa et al. | 212/316 |
| 5,882,164 | A | * | 3/1999 | Rapeli et al. | 414/141.3 |
| 6,092,969 | A | * | 7/2000 | Franzen et al. | 414/139.9 |
| 6,435,361 | B2 | * | 8/2002 | Franzen et al. | 212/325 |
| 6,551,043 | B2 | * | 4/2003 | Franzen et al. | 414/140.3 |
| 2002/0044854 | A1 | | 4/2002 | Franzen et al. | 414/140.3 |

FOREIGN PATENT DOCUMENTS

| | | | |
|---|---|---|---|
| DE | 297 19 466 | 5/1998 | B66C/17/20 |

* cited by examiner

*Primary Examiner*—Douglas Hess
(74) *Attorney, Agent, or Firm*—Cohen, Pontani, Lieberman & Pavane

(57) ABSTRACT

A loading device for ISO containers in a container terminal is arranged below the land-side boom in the rear area of the container bridge and cooperates with container transport vehicles. The loading device comprises at least two bridge members which are movable on the ground independent from one another transverse to the longitudinal axis of the boom, and are oriented parallel to one another and to the boom. Each bridge member forms a loading station for an ISO container and carries in the area of its longitudinal center a receiving platform for an ISO container which can be set down and picked up by load-carrying means, this receiving platform being rotatable about a vertical axis.

13 Claims, 9 Drawing Sheets

LOADING DEVICE FOR ISO CONTAINERS

BACKGROUND OF THE INVENTION

1. Field of the Invention

The invention is directed to a loading device for ISO containers in a container terminal for loading and unloading ships with a container bridge, a boom which extends at the gantry frame of the container bridge over its supporting construction on the water side and on the land side, and running rails for a crane trolley with container load-carrying means provided at the boom for transporting the container from ship to pier, and vice versa, wherein the loading device is arranged below the land-side boom in the rear area of the container bridge and cooperates with container transport vehicles.

2. Description of the Related Art

German Utility Model 279 19 466 discloses a loading and unloading system for containers which uses a container bridge formed by a gantry frame. The gantry frame is supported on a traveling mechanism which is movable along the rails parallel to the pier at which the ship is docked. The gantry frame has a boom extending over the supporting construction on the water side as well as on the land side and running rails are arranged at the boom for a crane trolley which transports containers from ship to pier, and vice versa, by means of a spreader. The spreader is designed in such a way that the crane operator can make the spreader engage with or disengage from the container with automatic locking.

The productivity-determining factor in a loading and unloading device of the kind mentioned above is the time period needed by the crane trolley to alternate loads, namely, the time required for conveying the containers from one location to another and for loosening or tightening the twistlock. As is well known, these twistlocks are used for preventing slippage of the containers which are stacked one above the other when transported, particularly when transported on ships. The containers are locked together in that the twistlocks engage in openings of the fittings and the parts arranged inside the fittings are twisted. Usually, semiautomatic twistlocks which are connected to the lower fittings of a container in a forward position during loading are used. When setting the container on another container, the twistlock is automatically locked with the fitting of the lower container, so that the two containers are fixedly connected to one another.

When unloading the containers from their present location, the container is first unlocked from the container below it or from the container vehicle by personnel and the upper container is transported from ship to shore with the twistlock still located on it. However, the twistlocks must be removed before the container is placed on the surface of the pier, which is likewise carried out manually in that the personnel charged with this task reaches under the suspended container and detaches the twistlock manually. Conversely, when loading, the container is initially lifted far enough so that the twistlocks can initially be inserted manually into the lower fittings before the container is transported to its new location.

German Utility Model 297 19 466 describes the unloading and loading of the containers in two overlapping phases, in which two crane trolleys are used, the first of which transports the container from the ship to a handling platform, while the second crane trolley transports the container from the platform to the desired track on the pier surface. A vehicle stands by at the pier surface to receive the container. The two crane trolleys transporting the containers at overlapping times reduces the productive work cycle time because it has been determined that less time is required for transporting a container between the ship and platform than for transporting the container to the loading track on the pier surface, including the removal or tightening of the twistlock.

However, the known solution is disadvantageous because although the use of the second crane trolley in the container bridge increases handling capacity, it results in additional relatively high investment, servicing and maintenance costs. Further, the platform for mounting and removing the twistlocks is not suitable for the handling of tank containers or other special containers (e.g., refrigerated containers or containers for shipping automobiles). While the support surfaces for the container shown in the reference allow free access to the corner fittings, a closed container base is mandatory for this technology. However, this is not always guaranteed in the case of special containers. As a result, these containers are sorted out and must be handled separately on the pier by additional personnel.

SUMMARY OF THE INVENTION

Based on the prior art, it is the object of the present invention to increase the total loading and unloading capacity of the container bridge through economical steps and, in so doing, also to ensure safe assembly and disassembly of the twistlocks at the corner fittings.

According to the invention, the loading device comprises at least two bridge members which are movable on the ground independent from one another transverse to the longitudinal axis of the boom, and are oriented parallel to one another and to the boom. Each bridge member forms a loading station for a container and carries in the area of its longitudinal center a receiving platform for an ISO container which can be set down and picked up by load-carrying means, this receiving platform being swivelable about a vertical axis.

The proposed loading device appreciably increases the loading and unloading capacity of the container bridge. It replaces the second trolley traveling mechanism in the container bridge and makes it possible to rotate the containers by at least 90° so that they arrive from the transporting position in the ship to the unloading position in the transporting vehicle. The at least two loading stations which are provided constitute an intermediate storage for the containers which is movable on traveling mechanisms from the loading area to the off-loading or on-loading area of the transporting vehicle.

The loading station is movable by at least one traveling mechanism on a runway or rail extending on the ground transverse to its bridge member. The rail which is preferably common to both loading stations allows an exact positioning of the loading station relative to the load receiving means of the container bridge on the one hand and relative to the traveling track of the transporting vehicle on the other hand. In this connection, the transport vehicle can be an automated driverless transport vehicle (FTV) or an automated guided vehicle (AGV). Alternatively, containers can also be transported for loading and unloading manually by straddle carriers.

According to a special feature of the invention, it is provided that every bridge member of every loading station is angled upward in an L-shaped manner and, by means of a rail traveling mechanism arranged at its upward angled end, is movable on a horizontal running rail which is arranged at a longitudinal member fastened to the supporting construction of the container bridge transverse to the boom. In this construction, the loading stations are connected in a positive engagement with the container bridge, wherein the construction allows the container bridge to move relative to the loading stations and the loading stations to move relative to the container bridge.

According to a further feature of the invention, another running rail extending parallel to the horizontal running rail is arranged at the underside of the longitudinal member and another rail traveling mechanism fastened to a tilting moment support of the loading station rolls on this running rail. This tilting moment support at the water-side rail traveling mechanism protects the loading station against tilting moments which can occur, for example, in the event of asymmetric loading of the receiving platform.

Since the relative horizontal movements between the container bridge and the loading stations must always be adapted to the different process sequences in the devices and to the respective loading and unloading conditions, another feature of the invention is a vertically acting telescoping base support arranged in the area where the angled bridge member part passes into the horizontal bridge member part. This is preferably actuated hydraulically and, in the supported state, receives the horizontal forces resulting from the sum of the rolling friction of the water-side driveless rail traveling mechanism and the rolling friction of the other rail traveling mechanisms. In this way, the loading station can be fixed relative to the ground for on-loading or off-loading a container from or to the transport vehicle. At the same time, the container bridge can be moved horizontally, e.g., for compensating heeling of a ship.

According to the invention, every rotatable receiving platform for the container is constructed for the support of different ISO container sizes and is connected via a pivoting connection to the bridge member so as to be drivable in rotation. Therefore, the receiving platform is capable of receiving any size of ISO container. By means of the pivoting connection and the rotating drive, the deposited container can be swiveled into a position rotated by 90° in which a transport vehicle can on-load or off-load the container.

It is particularly advantageous when the receiving platform of every loading station is provided in the areas contacted by the corners of the storable ISO container with recesses for gripping and handling the twistlock connections. When the receiving platform is located in the on-loading or off-loading position in the direction of the longitudinal axes of the L-shaped bridge member, the twistlock at the corner fittings of the container can be assembled and disassembled without difficulty through the recesses by the personnel responsible for this task.

When using transport vehicles which are preferably provided with receiving devices, another feature of the invention is that transport vehicles can travel over every loading station for receiving or depositing the ISO container when the receiving platforms of the loading station are oriented in its longitudinal direction. For this purpose, the loading station has been moved into one of its end positions corresponding to the traveling tracks of the transport vehicles by transverse movement on its rail traveling mechanisms.

In a construction of the invention it is also conceivable that every loading station which is movable on the ground can be moved by rail traveling mechanisms at both of its ends on runways or rails placed on the ground and its movement sequences can be coordinated with respect to the other loading station and with respect to the horizontal movement of the container bridge. In this embodiment form, the loading stations are not connected with the container bridge in a positive engagement, but their movement sequences are coordinated with those of the container bridge. Without otherwise altering the movement processes, both rail traveling mechanisms travel on rails which are spaced apart, rather than on the girder of the container bridge. Also, in this solution it is possible for the loading stations and the container bridge to travel transversely independent from one another by providing a corresponding traveling control for the driven traveling mechanisms.

A working process for operating a loading device for ISO containers such as that described above is characterized by the following successive work steps when unloading a container ship:

Assuming a ship is being unloaded, the container suspended at the load-carrying means is lowered and deposited on the receiving platform of a loading station.

By rotating the receiving platform by 90°, the container is brought into a position in which the longitudinal axis of the container extends in longitudinal direction of the loading station.

The loading station is moved transversely into an off-loading position in which the transport vehicle takes over the container.

While the container is being transferred, the other loading station is moved transversely under the load-carrying means and is loaded with another container after the receiving platform has been rotated by 90° relative to the longitudinal direction of the loading station.

The processes are repeated alternately so that at least one loading process and unloading process is always underway simultaneously.

A working process for operating a loading device when loading a container ship includes the following work steps:

The loading station is moved transversely into a transfer station in which the transport vehicle delivers the container.

By rotating the receiving platform by 90°, the container is brought into a position in which the longitudinal axis of the container extends transverse to the longitudinal direction of the loading station.

The container is lifted from the receiving platform of the loading station by the load-carrying means and is transported in suspended manner to the ship.

While the container is being taken on, the other transversely movable loading station is loaded with another container by another transport vehicle after the receiving platform has been rotated by 90° relative to the longitudinal direction of the loading station.

The processes are repeated alternately so that at least one loading process and unloading process is always taking place at the same time.

A partial overlapping of the rotating movement and transverse movement would be possible for the purpose of reducing cycle time (e.g., the transverse movement is initiated after ⅓ of the rotating movement).

The novel arrangement is advantageous as an economical addition to known loading and unloading equipment because the loading device replaces a second trolley in the container bridge. Therefore, the costs of acquiring and maintaining are appreciably lower compared to conventional solutions such as those suggested in the prior art taken as a point of departure by the invention. The loading device is suitable for full automation and can also be retrofitted to existing systems. The capacity of the container terminal can be noticeably increased by the invention because two to three loading tracks can be serviced by one trolley traveling mechanism with the loading device. Time-critical sequences in terminal logistics management are prevented by the deliberate control of the container bridge in backreach by the AGVs or straddle carriers. The quantity of required container transport vehicles can accordingly be reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
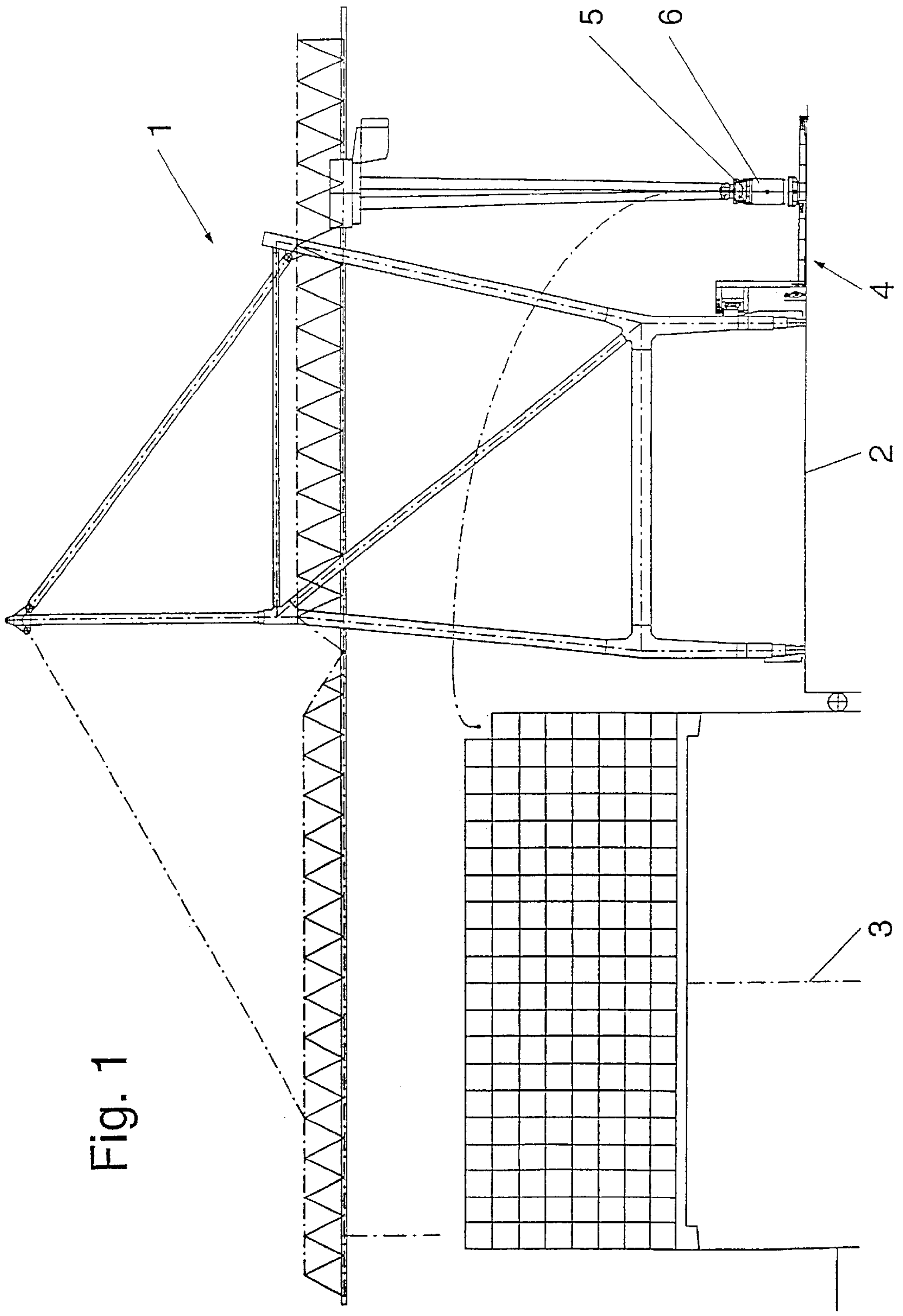
FIG. 1 shows an overall view of a container bridge with the loading unit according to the invention.

In an overall view of the pier installation of a container terminal, FIG. 1 shows a container bridge 1 by which a container ship 3 lying off a pier 2 is loaded. For this purpose, an additional loading device 4 according to the invention is provided at the rear side of the container bridge remote of the ship. The container 6 is suspended from a spreader 5 which is movable by a trolley traveling mechanism at a boom which extends on the water-side over the ship and projects over the supporting construction of the container bridge at its opposite side.

Figure 2:
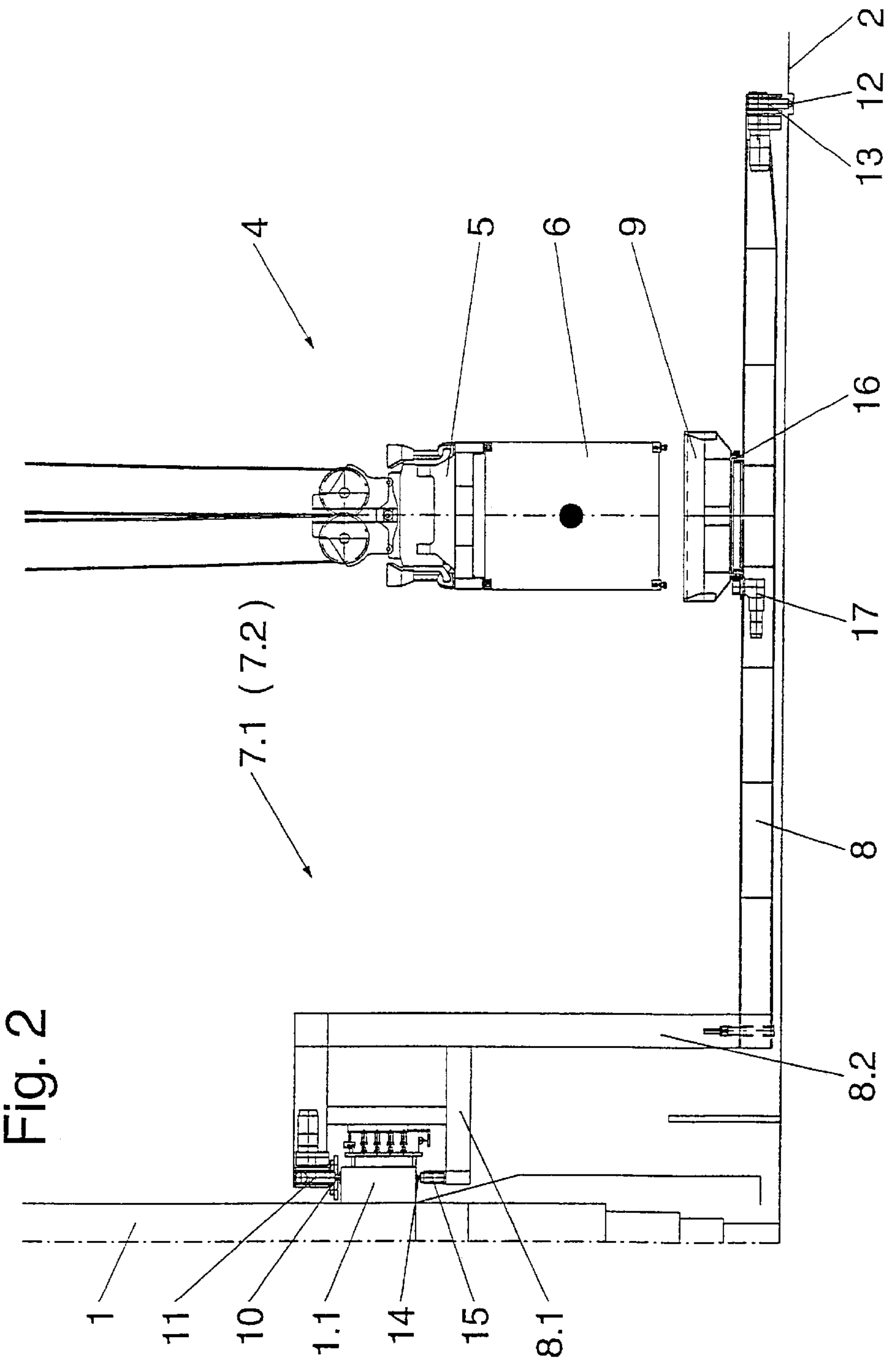
FIG. 2 shows a detailed view of the loading device from FIG. 1.

FIG. 2 is a detailed view of the loading device 4 showing one of two loading stations 7.1 and 7.2. Each loading station comprises an L-shaped bridge member 8 and the rotating receiving platform 9. The upper side of the longitudinal member 1.1 of a crane path which is supported at the container bridge 1 forms the base for a crane rail 10. The L-shaped bridge member 8 is supported on the crane rail 10 by its water-side rail traveling mechanism 11. The second crane rail 12 on the pier 2 serves as a runway for the land-side rail traveling mechanism 13.

The underside of the member 1.1 of the crane path mounted at the container bridge 1 forms the basis for another crane rail 14 on which the rail traveling mechanism 15 of a tilting moment support 8.1 rolls. The relatively small axial distance between the wheels in the water-side rail traveling mechanism 11 and a possible asymmetric loading of the rotating platform 9 make this additional tilting load safety arrangement indispensable.

The L-shaped bridge member 8 and the receiving platform 9 are connected to one another by a pivoting connection 16. The platform is driven by a rotating mechanism 17 so as to be swivelable by 360° in a continuous manner.

The relative horizontal movements between the container bridge 1 and the loading stations 7.1 and 7.2 are adapted to the different process sequences in the devices and to the respective loading and unloading conditions. In this connection, when loading and unloading the rotating platform 9 with the container bridge 1, it is necessary to synchronize the horizontal movements of the container bridge 1 and loading stations 7.1 and 7.2.

Figure 3:
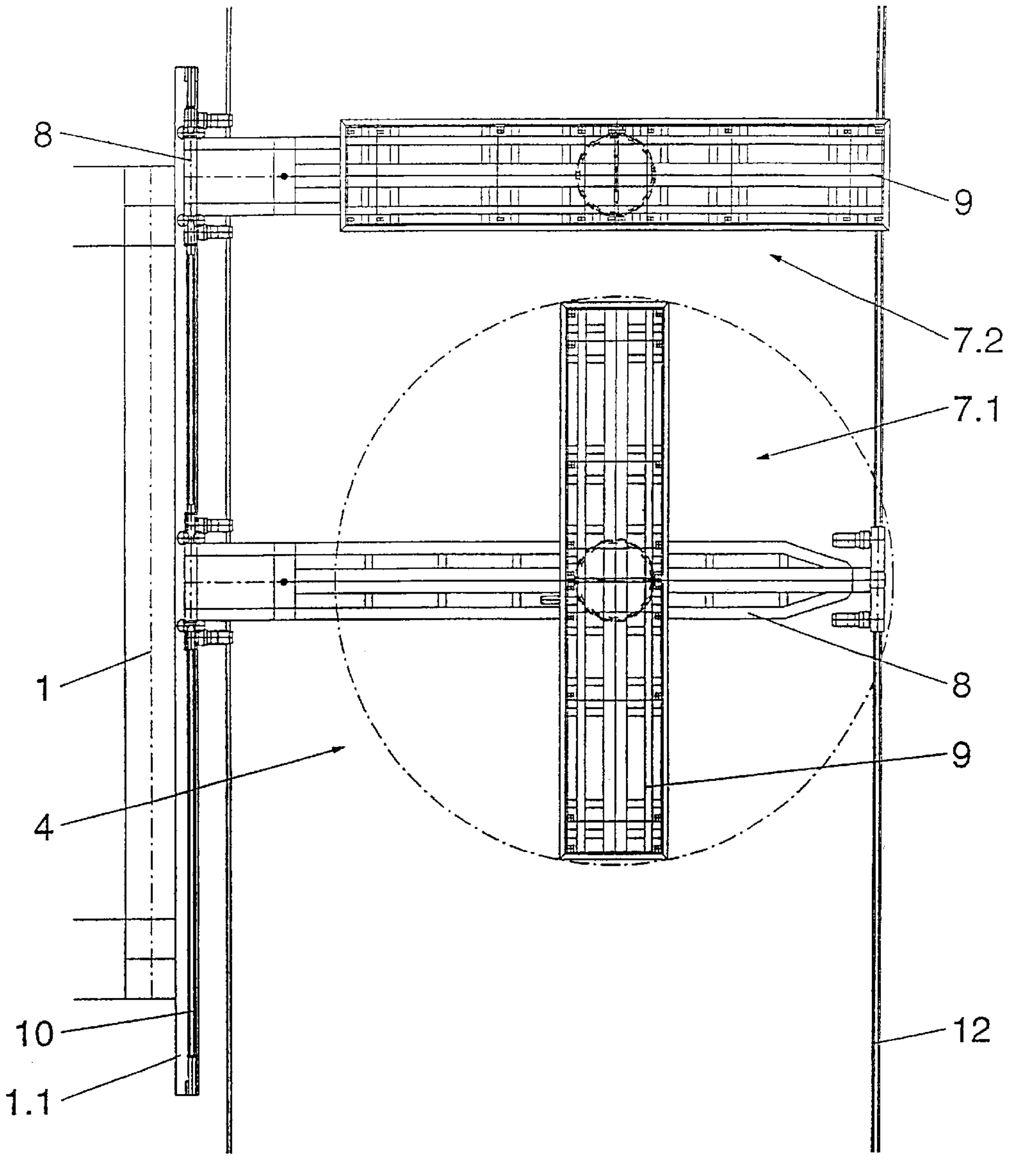
FIG. 3 shows a top view of the loading device according to FIG. 2.

FIG. 3 shows a top view of the loading device 4 described above. It will be seen that two loading stations 7.1 and 7.2 which move separately on the two crane rails 10 and 12 are associated with a loading device. The length of the crane path girder 1.1, and therefore also the possible rail length, depends on the length-over-buffer measurement of the container bridges. The traveling and rotating movements of the loading stations are coordinated, controlled and monitored by managing terminal logistics.

The receiving platform 9 of the loading station 7.1 which is swiveled by 90° relative to the L-shaped bridge member 8 by means of a rotating mechanism 17 of the pivoting connection 16 is located in the loading or unloading position of the container bridge. When the loading station 7.2 is at an outer maximum position, as shown in FIG. 3, the longitudinal axes of the L-shaped bridge member 8 and the rotating platform 9 run parallel.

Figure 4:
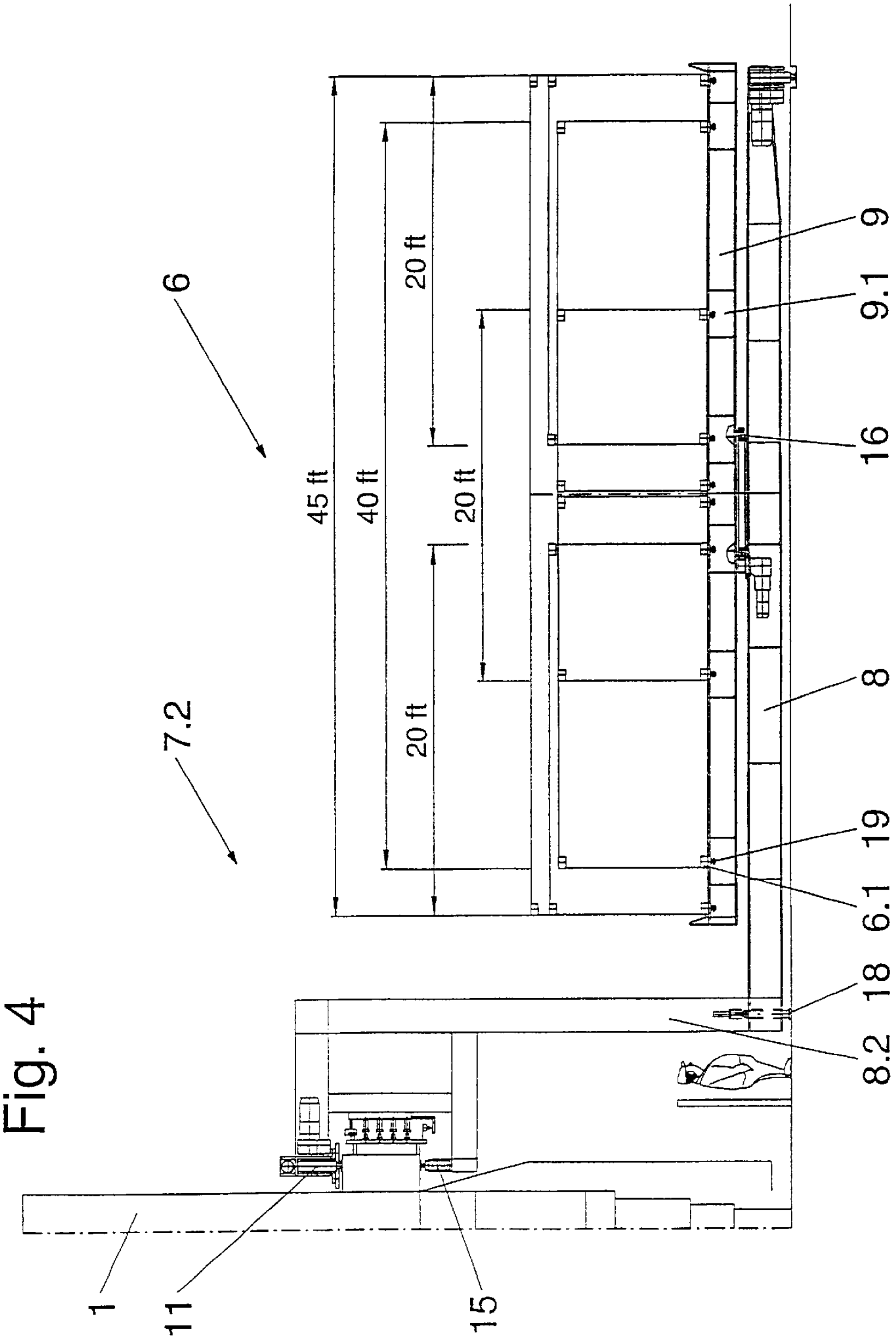
FIG. 4 shows a view of the loading station with receiving platform rotated by 90°.

In FIG. 4, it can be seen that the loading station 7.2 (as well as loading station 7.1, not shown) carries a pivoting connection 16 which is connected to the L-shaped bridge member 8 and the receiving platform 9. Containers 6 are shown in various sizes (20 feet, 2×20 feet, 40 feet and 45 feet) supported in possible positions on the receiving platform 9. The relative horizontal movements between the container bridge 1 and loading station 7.2 are adapted in different process sequences in the devices. In this view, for example, it is necessary when loading and unloading the receiving platform 9 by a container transporter (AGV or straddle carrier) to fix the L-shaped bridge member 8 in its instantaneous position. However, the container bridge 1 should continue to operate freely. But the horizontal movements of the container bridge 1 occurring in this connection, e.g., produced by runway movements for correcting the heeling of the ship, may not be transferred to the loading station 7.2.

In order to prevent this, a support 18 is provided at the lower end of the bridge member 8 in the area of its part 8.2 that is angled upwards. This support 18 can be actuated hydraulically and can absorb the horizontal forces resulting from the summed rolling friction of the water-side driveless rail traveling mechanism 11 and of rail traveling mechanism 15. The support 18 can have correspondingly small dimensions.

In the position shown in FIG. 4 in which the longitudinal axes of the L-shaped bridge member 8 and of the receiving platform 9 are in a parallel position relative to one another, it is also possible for personnel to assemble or disassemble the twistlocks 19 at the container corner fittings 6.1. This is facilitated by large openings 9.1 at the longitudinal sides of the receiving platform 9.

Figure 5:
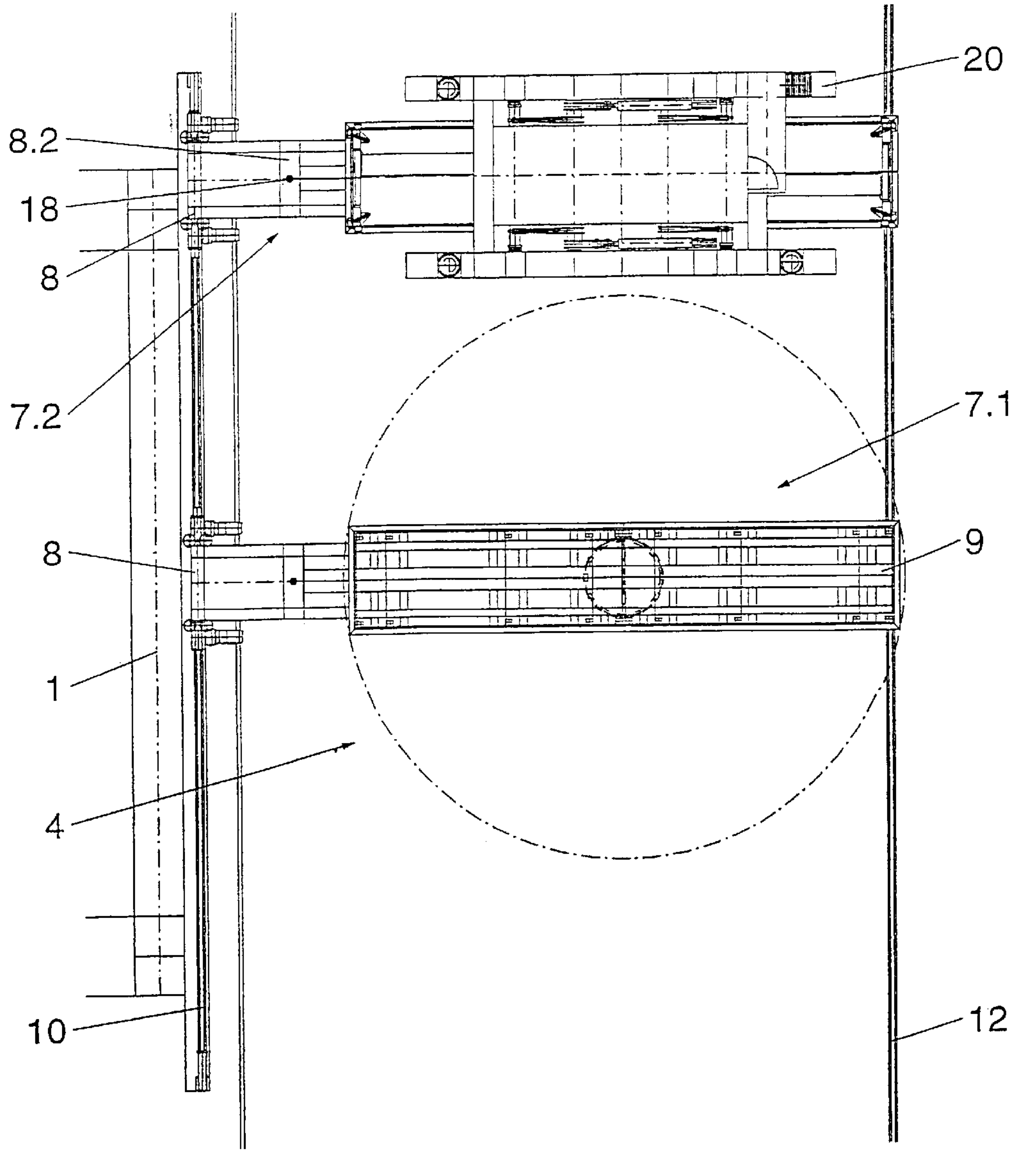
FIG. 5 shows a top view of the loading device.

FIG. 5 shows another top view of a loading device of the invention. The drawing shows the loading device 4 with the two loading stations 7.1 and 7.2 which move separately on the crane rails 10 and 12. The loading station 7.1 is in the loading or unloading position of the container bridge 1. After the receiving platform 9 has been swiveled by 90°, the longitudinal axes of the L-shaped bridge member 8 and receiving platform 9 run parallel.

The loading station 7.1 is at the outer maximum position. In this position and in this mode, both loading stations allow loading and unloading by a container transporter 20. However, it is necessary in this situation that the L-shaped bridge member 8 is fixed in its instantaneous position, i.e., the support 18 arranged at the lower end of the upwardly bent portion 8.2 of the bridge member is activated.

Figure 7:
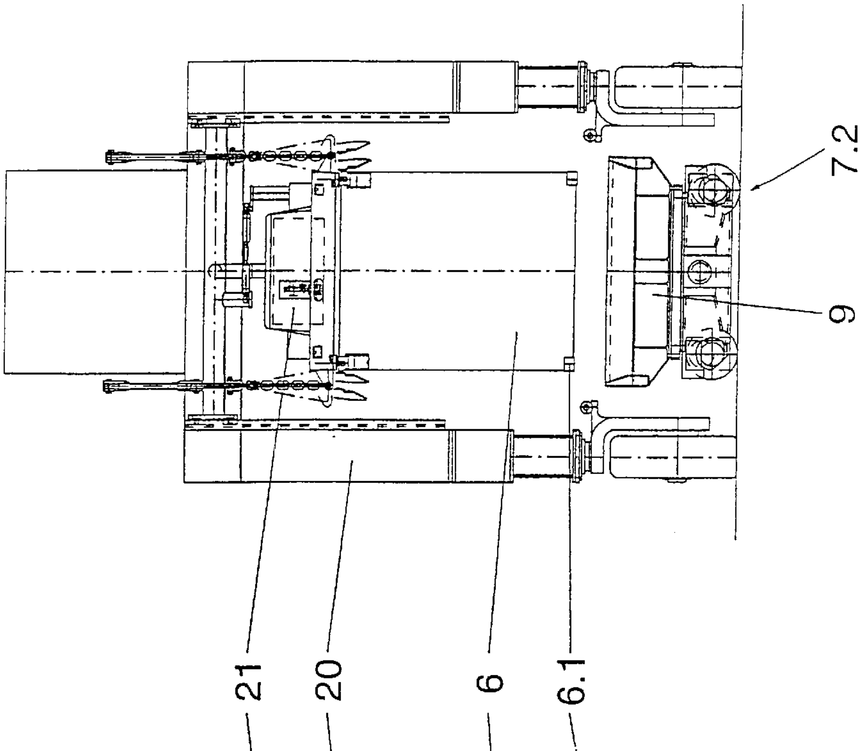
FIGS. 6 and 7 show a load being received by a transport vehicle in two steps.
Figure 6:
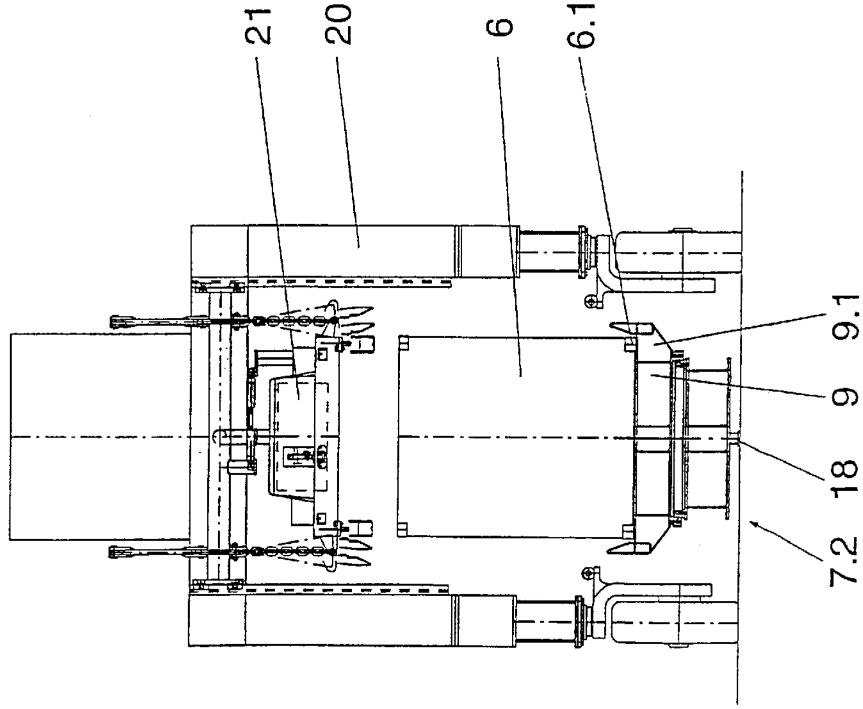

FIGS. 6 and 7 show the load-carrying process by means of a container transport vehicle. When the support 18 is actuated, the unloading process is carried out in the loading station 7.2. After the twistlocks have been dismantled by the responsible personnel through the mounting openings 9.1, seen below the container corner fittings 6.1, at the longitudinal sides of the receiving platform 9, a container transporter 20 takes over the container 6 from the receiving platform 9 by means of a spreader 21 and transports it to the container storage or to a delivery conveyance.

Figure 8:
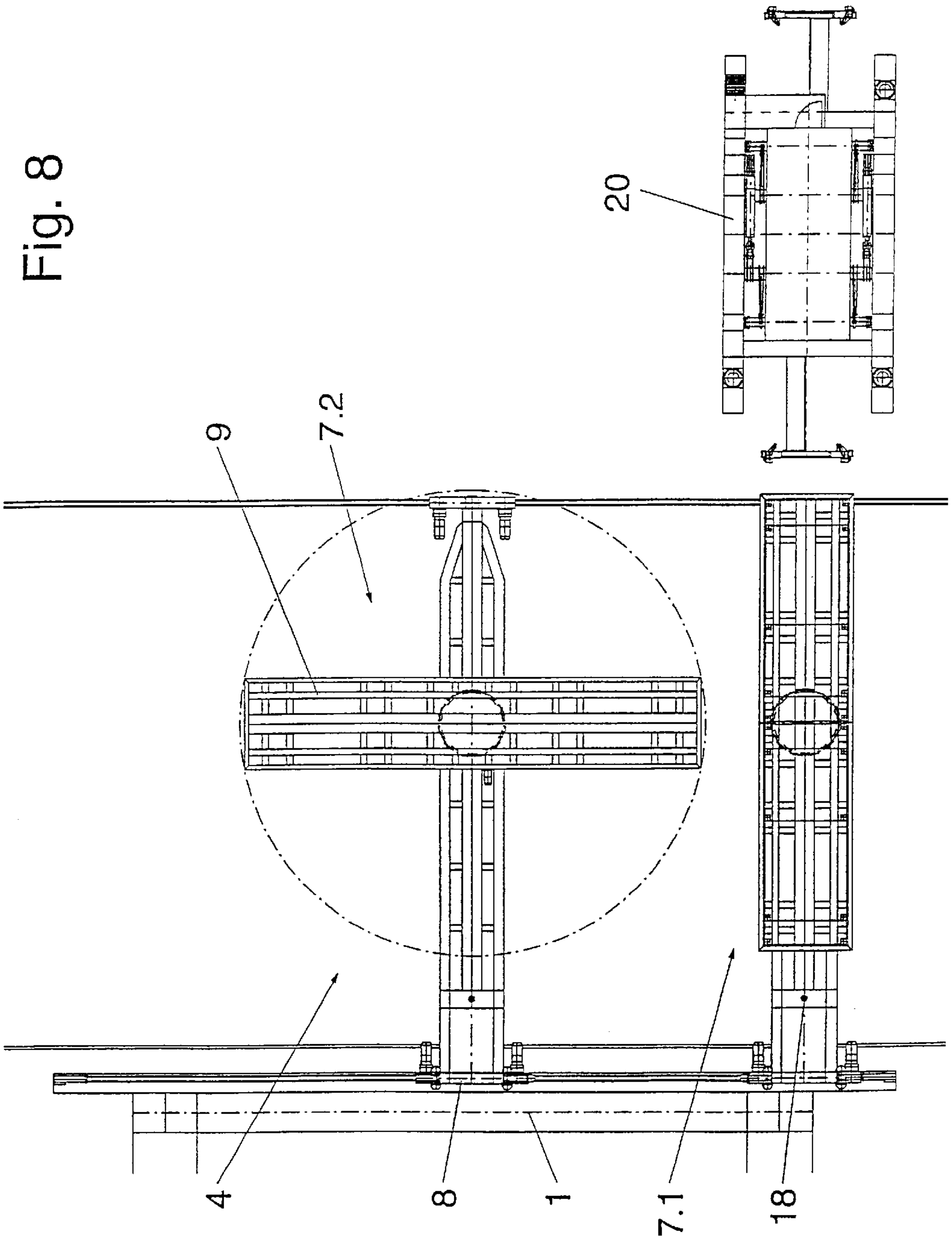
FIG. 8 shows a top view of the loading device in another receiving position.

FIG. 8 is a top view of the loading device 4 with its two loading stations 7.1 and 7.2. The loading station 7.1 is located at an outer maximum position. The support 18 is activated; the loading station 7.1 waits in this position for the unloading process by a container transporter 20. The loading station 7.2 is in the loading and unloading station of the container bridge 1. In loading station 7.2, the rotating receiving platform 9 mounted on the L-shaped bridge member 8 has been swiveled back by 90°. Accordingly, it is again ready for a loading process by the container bridges 1. The drives of the rail traveling mechanisms of the container bridge 1 and loading station 7.1 are switched synchronously.

Figure 9:
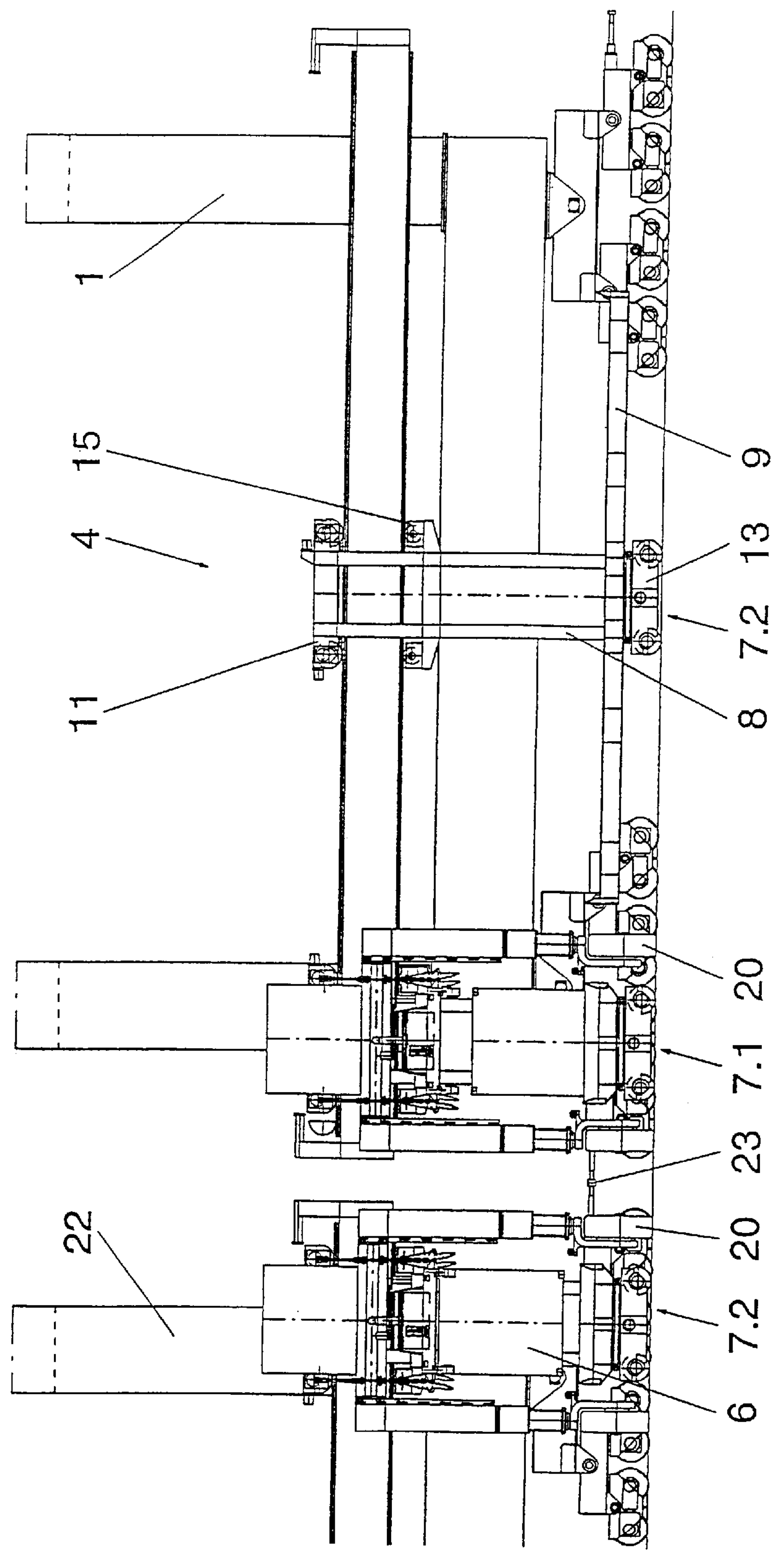
FIG. 9 shows a front view of the loading device according to FIG. 8.

FIG. 9 shows a front view of the situation shown and described in FIG. 8. The drawing also shows a configuration with a cooperating second container bridge, 22 which is positioned up to the buffer stop 23 to the first container bridge 1. A container 6 can be loaded and unloaded by a container transporter 20 from the loading station 7.2 operating at the second container bridge 22 independent from the loading device 4 of the first container bridge 1.

Figure 10:
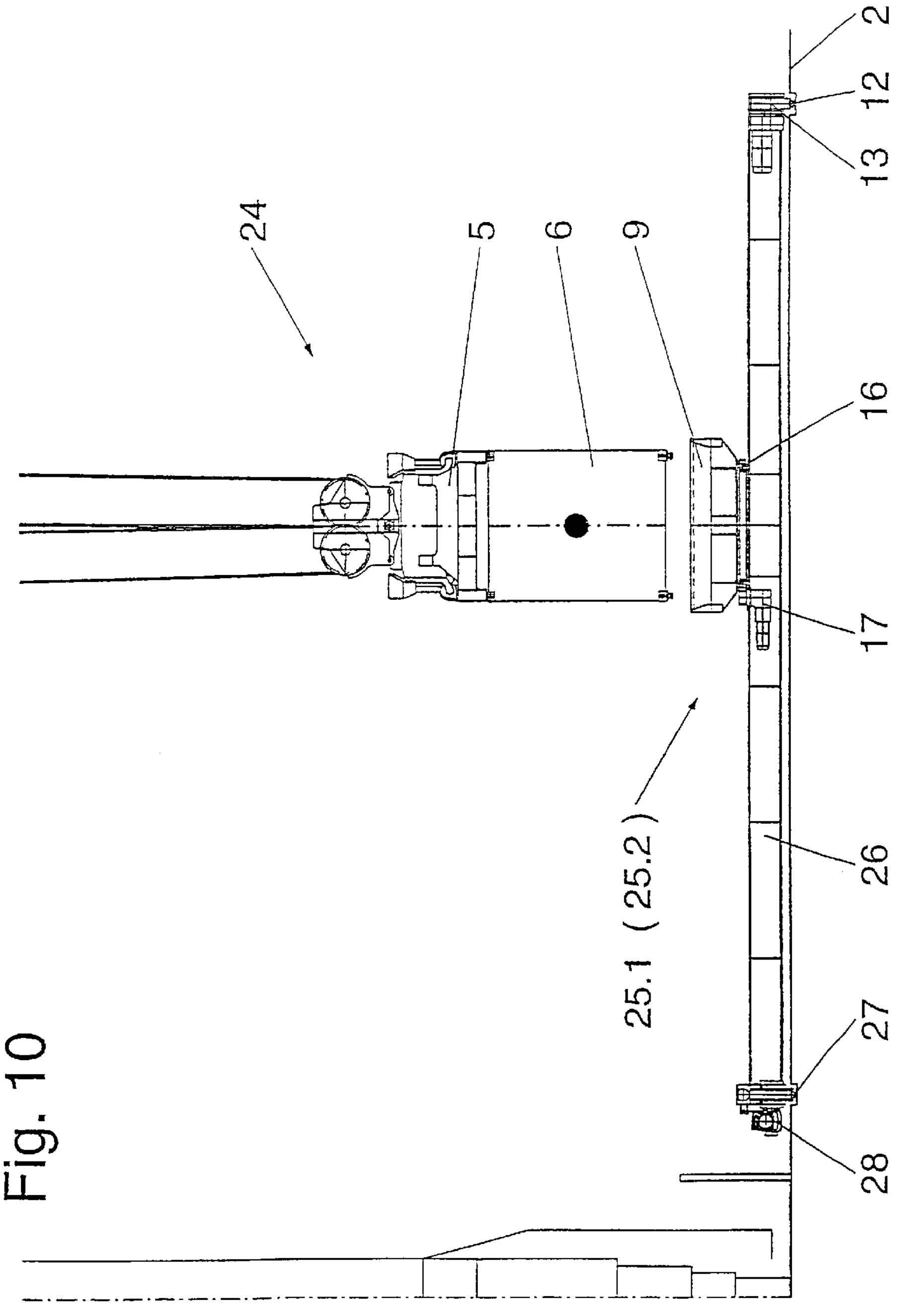
FIG. 10 shows an alternative loading device with two rail traveling mechanisms.

Finally, FIG. 10 shows a detailed view of an alternative construction of the loading device according to the invention. The runways of two rail traveling mechanisms arranged at the two ends of the bridge member 26 are located on the pier. A direct connection with the container bridge is not made, but rather only a controlled logistic connection. The drawing shows one of two loading stations 25.1 and 25.2 of the alternative loading device 24. A loading station comprises a bridge member 26 and the receiving platform 9. A first crane rail 27 on the pier 2 is used as a runway for the water-side rail traveling mechanism 28 and the second crane rail 12 is used as a runway for the land-side rail traveling mechanism 13. The axial distance between the wheels in the water-side rail traveling mechanism 27 is selected so as to be sufficiently large that a possible asymmetric loading of the rotating platform 9 does not result in tilting of the loading stations 25.1 and 25.2. The bridge member 26 and the receiving platform 9 are connected with one another by a pivoting connection 16 by means of which the receiving platform, driven by a rotating mechanism 17, can be swiveled continuously by 360°.

The relative horizontal movements between the container bridge 1 and loading stations 25.1 and 25.2 are adapted to the different process sequences in the devices and to the loading and unloading conditions. For example, when the receiving platform 9 is loaded and unloaded by the container bridge 1 it is necessary to synchronize the horizontal movements of the container bridge 1 and loading stations 25.1 and 25.2. Neither the hydraulic support 18 described in connection with the other solution nor its function are required in the alternative loading device shown here, because the loading device and container bridge are decoupled from one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A loading device for ISO containers in a container terminal with a container bridge for loading and unloading ships, said container bridge comprising a gantry frame having a water side and a land side, a boom extending over the gantry frame on the water side and on the land side, and running rails on the boom for a crane trolley with a load carrying device for transporting a container from ship to pier and vice versa, said loading device being arranged below the boom on the land side for cooperating with said load carrying device and with container transport vehicles, said loading device comprising at least two loading stations comprising respective bridge members movable on the ground independent of one another in a direction transverse to the longitudinal axis of the boom, said bridge members being parallel to one another and to the boom, each said bridge member having a longitudinally central area carrying a receiving platform for an ISO container which can be set down and picked up by said load carrying device, each said receiving platform being rotatable about a vertical axis.

2. A loading device as in claim 1 wherein each said loading station comprises a traveling mechanism for driving said bridge member on one of a runway and a rail on the ground.

3. A loading device as in claim 1 wherein each said bridge member is L-shaped and has a horizontal part and a vertical part, said loading device further comprising a first horizontal rail arranged on a longitudinal member fastened to said gantry frame on said land side and extending transversely to the longitudinal axis of the boom, and a first rail traveling mechanism fixed on said vertical part, said first rail traveling mechanism moving on said first horizontal rail and supporting said bridge member.

4. A loading device as in claim 3 further comprising a second horizontal rail arranged under said longitudinal member, a tilting moment support fixed to said vertical part, and a second rail traveling mechanism fixed to said tilting moment support and moving on said second horizontal rail.

5. A loading device as in claim 4 further comprising a vertically acting telescoping base support arranged on said bridge member where said horizontal part meets said vertical part.

6. A loading device as in claim 1 further comprising means for driving said receiving platform in rotation with respect to said bridge member, said receiving platform being constructed to support different sizes of ISO containers.

7. A loading device as in claim 1 wherein each said receiving platform comprises recesses for accessing twist-lock connections on ISO containers being secured to said platform.

8. A loading device as in claim 1 wherein each said receiving platform can be oriented parallel to the respective bridge member so that a transport vehicle can travel over the respective said loading station.

9. A loading device as in claim 1 further comprising a pair of runways or rails on the ground, and a rail traveling mechanism at each end of each said bridge member, said rail traveling mechanisms moving on said rails, each said loading station moving in coordination with movements of each other loading station and said container bridge.

10. A method for unloading a ship at a container terminal comprising a container bridge for loading and unloading ships, said container bridge comprising a gantry frame having a water side and a land side, a boom extending over the gantry frame on the water side and on the land side, and running rails on the boom for a crane trolley with a load carrying device for transporting a container from ship to pier and vice versa, said container terminal further comprising a loading device arranged below the boom on the land side for cooperating with said load carrying device and with container transport vehicles, said loading device comprising at least two loading stations comprising respective bridge members movable on the ground independent of one another in a direction transverse to the longitudinal axis of the boom, said bridge members being parallel to one another and to the boom, each said bridge member having a longitudinally central area carrying a receiving platform for an ISO container which can be set down and picked up by said load carrying device, each said receiving platform being rotatable about a vertical axis, said method comprising lowering and depositing an ISO container suspended by said load carrying device onto the receiving platform of a first said loading station, rotating the receiving platform into parallel alignment with the bridge member, moving said loading station in said direction transverse to the boom to an off-loading position where the container is transferred to a transport vehicle, while the container is being transferred, moving a second said loading station to a position under said load carrying device, rotating the receiving platform of said second loading station into orthogonal alignment with the bridge member, lowering and depositing an ISO container suspended by said loading carrying device onto the receiving platform of said second loading station, and repeating the steps alternately so that one of said loading stations is always being loaded while another one of said loading stations is being off-loaded.

11. A method as in claim 10 wherein the transverse movement of the loading station and the rotation of the receiving platform occur simultaneously.

12. A method for loading a ship at a container terminal comprising a container bridge for loading and unloading ships, said container bridge comprising a gantry frame having a water side and a land side, a boom extending over the gantry frame on the water side and on the land side, and running rails on the boom for a crane trolley with a load carrying device for transporting a container from ship to pier and vice versa, said container terminal further comprising a loading device arranged below the boom on the land side for cooperating with said load carrying device and with container transport vehicles, said loading device comprising at least two loading stations comprising respective bridge members movable on the ground independent of one another in a direction transverse to the longitudinal axis of the boom, said bridge members being parallel to one another and to the boom, each said bridge member having a longitudinally central area carrying a receiving platform for an ISO container which can be set down and picked up by said load carrying device, each said receiving platform being rotatable about a vertical axis, said method comprising moving a first said loading station in said direction transverse to said boom to a transfer station, loading an ISO container from a transport vehicle onto said receiving platform, rotating said receiving platform into orthogonal alignment with the bridge member, lifting the ISO container from the receiving platform by said load carrying device and transporting said ISO container to said ship, rotating the receiving platform of a second said loading station into parallel alignment with the bridge member, while said ISO container is being transported to said ship, loading an ISO container from a transport vehicle onto said receiving platform of said second loading station, and repeating the steps alternately so that one of said loading stations is always being loaded while another one of said loading stations is being off-loaded.

13. A method as in claim 10 wherein the transverse movement of the loading station and the rotation of the receiving platform occur simultaneously.

* * * * *